United States Patent [19]
Grove

[11] Patent Number: 5,857,103
[45] Date of Patent: Jan. 5, 1999

[54] METHOD AND APPARATUS FOR ADDRESSING EXTENDED REGISTERS ON A PROCESSOR IN A COMPUTER SYSTEM

[75] Inventor: Daniel D. Grove, San Jose, Calif.

[73] Assignee: Sun Microsystems, Inc., Palo Alto, Calif.

[21] Appl. No.: 663,838

[22] Filed: Jun. 14, 1996

[51] Int. Cl.[6] .................................................. G06F 9/40
[52] U.S. Cl. ............................................................ 395/705
[58] Field of Search .................................... 395/701, 703, 395/706, 707, 709, 581, 705; 711/132

[56] References Cited

U.S. PATENT DOCUMENTS

| | | | |
|---|---|---|---|
| 5,428,793 | 6/1995 | Odnert et al. ............................ | 395/709 |
| 5,560,013 | 9/1996 | Scalzi et al. ............................. | 395/705 |
| 5,613,121 | 3/1997 | Blainey ................................... | 395/709 |
| 5,724,565 | 3/1998 | Dubey et al. ............................ | 395/595 |

FOREIGN PATENT DOCUMENTS 051131A  5/1982  European Pat. Off. .

OTHER PUBLICATIONS

ACM Translation on Programming Languages & Systems, vol. 12, No. 4, Oct. 1990, New York, p. 501536, Fred C. Chow et al., "The Priority–Based Coloring Approach to Register Allocation".

Computer Languages, vol. 6, 1981, pp. 47–57, G.J. Chaitin et al., "Register Allocation Via Coloring".

*Primary Examiner*—Emanuel Todd Voeltz
*Assistant Examiner*—Matthew Smithers
*Attorney, Agent, or Firm*—Erwin J. Basinski

[57] ABSTRACT

In its various embodiments, the present invention provides a method and apparatus for creating a target executable program from the source code of a target computer program for execution on a target processor. The target processor provided by the method and apparatus has a first set of registers and a second set of registers. Generally, the target processor is capable of executing a first set of instructions which only address the first set of registers. The method and apparatus provides a second set of instruction for the target processor which include a subset of frequently executed instructions within the first set of instructions. These second set of instructions are novel because they able to address both the first set of registers and the second set of registers. A compiler is provided and used for compiling the source code into a number of target executable instructions and allocating the registers on the target processor. The registers within the second set of registers are only allocated to those target executable instructions in the second set of instructions. According to principles of the present invention, the more frequently executed instructions are able to address a register in the second set of registers located on the target processor.

15 Claims, 10 Drawing Sheets

METHOD AND APPARATUS FOR ADDRESSING EXTENDED REGISTERS ON A PROCESSOR IN A COMPUTER SYSTEM

BACKGROUND OF THE INVENTION

1. Field of the Invention

This invention relates to the field of computer architecture and compiler design. More specifically, the invention is a method and apparatus for generating instructions capable of addressing an additional set of registers on a central processing unit (CPU).

2. Background

There is an ongoing effort to make computer programs as efficient as possible in their execution time. This has driven the development of multiple issue computer processors. The multiple issue computer architecture improves execution efficiency by processing multiple instructions in parallel each clock cycle rather than only a single instruction each clock cycle. Currently, multiple issue processors issue from 2–4 instructions during each clock cycle on the processor. Some examples of multiple issue processor designs are Sun's UltraSPARC™ (4 issue), IBM's PowerPC™ series (2–4) issue, MIPS' R10000™ and Intel's Pentium-Pro™ (3 issue). (These processor names are the trademarks respectively of Sun Microsystems, Inc., International Business Machines (IBM) Corp., MIPS Technologies, Inc. and Intel Inc.). Typically, these processors contain multiple I/O memory ports, integer adders, floating point adders, multipliers and other functional units which enable them to execute multiple instructions simultaneously each machine cycle.

A compiler takes the source code of a computer program and generates an executable module containing machine specific instructions designed to execute on a particular processor. Most modern compilers also have an optimizer designed to schedule instructions and make use of available hardware resources in the most efficient manner possible. A multiple issue processor typically requires an optimizing compiler to maximize the issuance of multiple instructions each machine cycle. FIG. 1 illustrates a conventional optimizing compiler 100 used for a multiple issue processor. The compiler 100 typically contains a front end 102, a code generation section 104, an optimizer section 106 and a backend section 108. First, the source code for a computer program is generated by a user and provided to the front end 102 of the compiler where various pre-processing functions are performed. Next, the code is provided to the code generation section 104 which generates a set of instructions expressed in an intermediate code which is semantically equivalent to the source code. Typically, the intermediate code is expressed in a machine-independent format. The code optimizer 106 accepts the intermediate instruction set and performs various transformations to schedule the instruction set in a faster and more efficient manner. Finally, the backend 108 accepts the optimized intermediate code and generates a target executable program 110 which includes a set of machine instructions in binary format which can be executed on a specific target machine (i.e. SPARC, Intel, PowerPC, MIPS etc.). Each machine instruction includes an operation code (opcode) portion and an operand portion containing one or more operands. The opcode portion of the machine instruction instructs the target machine to execute specific functions. The operand portion of the instruction is used to access data stored in the registers during execution.

Efficient execution of the optimized target computer program is limited, in part, by the availability of registers. These registers are located on board the processor and can store and retrieve data faster than memory or any other storage subsystem. During compilation the backend 108 allocates the registers to instructions which store data and operands in registers. Accordingly, an executable computer program would run most efficiently if the backend could allocate registers to all instructions.

Register pressure is a condition which occurs when the mixture of instructions provided to the processor demands more registers than immediately available. When registers are unavailable the instructions must store data in storage mediums having slower read and write access times such as memory or disk thus creating register "spill over". Significant register "spill over" can cause even a highly optimized target executable program to run less efficiently as the latency in retrieving data from these slower storage mediums becomes the processing bottleneck.

For example, assume a multiple issue processor 200 in FIG. 2A has 32 registers in a register set 208 and processor elements 210 are capable of issuing eight instructions each machine cycle. Accordingly, an instruction group 214 in FIG. 2B contains eight instructions (N=8) which can be executed simultaneously on multiple issue processor 200. Further assume, each instruction retains only two registers for a period of four instruction cycles to complete execution. Consequently, an eight issue multiple issue processor 200 must allocate sixteen registers each machine cycle. This translates to 64 registers each four machine cycles. Unfortunately, all 32 of the available registers on the processor are allocated after only the first two machine cycles. Any instruction issued after the first two machine cycles must "spill over" any operands or data into slower storage such as memory or disk until registers become available once again. Performance on this processor becomes limited by the access times of the numerous storage devices on the system.

Register pressure may be reduced in several steps. First, a second or extended set of registers is added to multiple issue processor 200. For example, in the previous example a second set of 32registers can be added to the first set of registers and make 64 registers available on the processor. Unfortunately, this procedure is not the most difficult aspect of reducing register pressure on a processor. In fact, those skilled in the art of chip fabrication can add a second register set on a processor relatively easily using numerous techniques well known in the art.

Addressing the second set of registers is the more difficult problem. Unfortunately, conventional instruction layout formats 216 are unable to address the second set of registers. For example, in FIG. 2B only five bits are reserved in the DR register address field 216B and five bits are reserved in the SR register address field 216C. A five bit register address field can only address the 32 registers in the first set of registers. More than five bits are required to address the second or extended set of registers on a processor. Accordingly, there is a need to devise a method of addressing a second set of registers on multiple issue processor 200.

In the past, a second set of registers on a processor were addressed by adding additional bits to the length of each instruction in the instruction set. These wider instructions used the additional bits to address the registers in the second set of registers. The normal progression is to increase the bit length of instruction from 32 to 64 bits. For example, assume 3 additional bits are required to address additional registers located on a processor which executes 32 bit instructions. Traditionally, these 3 additional bits would be accommodated by increasing the instruction length to 64 bits.

Unfortunately, increasing the bit width of an instruction has several disadvantages. First, processors with wider instruction words are typically incompatible with legacy software compiled for older processors with shorter instruction words. Generally, processors with wider (e.g. 64 bit) instruction words are unable to execute software compiled for narrower instruction words (e.g. 32 bit) and vice-versa. As a result, software developers must recompile each software program for each type of computer. Users and software developers can not enjoy the luxury of using a single executable program across a family of computers. Furthermore, it is more difficult for hardware manufacturers to sell new computers if they can not execute a user's existing software applications.

Second, the increased instruction width is also undesirable because computer programs with wider instruction words require twice the amount of storage in memory and disk. For example, a binary 64-bit instruction word takes up approximately twice as much storage as the corresponding 32-bit instruction word. It would be desirable to address an extended number of registers on a processor without having twice the storage and memory requirements.

Third, increasing the width of the instruction is undesirable because it may increase the cost of the computer system. Increasing the width of an instruction also requires that various bus widths within the computer increase. A computer system with wider bus widths runs more efficiently because wider instruction words can be fetched and processed in less cycles than on a narrower bus architecture. However, this will cost the computer manufacturer a great deal of money redesigning the processor, busses and all the related computer cards and peripherals to accept the wider instruction words. Ultimately, these higher costs will be passed along to the consumer. It would be advantageous to have an instruction set address an additional set of registers without having to redesign various components within the computer system.

The present invention provides techniques to address additional registers without the previously mentioned disadvantages. The present invention uses an elegant method and apparatus to address an extended set of registers on a processor without increasing the width of the instruction.

SUMMARY OF THE INVENTION

There are several advantages the present invention provides which were unavailable in the past. First, the present invention enables instructions to address a second set of registers on a processor without extending the width of the instruction word. In its various embodiments, the present invention utilizes unused bits in the instruction set to address additional registers available on the processor. As a result, older computer hardware and software will remain fully compatible with newer hardware and software utilizing the present invention.

Second, the present invention does not require additional memory and disk space to store instructions generated with the present invention. In the past, additional registers on a processor could only be addressed by increasing the instruction word width. Consequently, the wider instruction words required twice or three times the original memory and disk space as the original instruction words. In contrast, the present invention does not require additional disk or memory storage to execute efficiently. Instead, the present invention uses one or more of the unused bits in a given instruction to address the additional registers. Executables generated using the present invention do not require more disk or memory storage because they are the same size as executables generated using other techniques not presented by the present invention.

Third, the present invention can be utilized in a computer system at a minimal cost. Manufactures of computer systems with a processor using the present invention will not have to modify various bus widths within the system because the instruction bit width is not increased. This will eliminate engineering design costs to redesign the hardware and tooling costs associated with manufacturing new computer hardware equipment. In this manner, a second set of registers can be utilized by a computer system in a very cost effective manner. The present invention enables an instruction in an instruction set to address an additional set of registers without having to redesign various components of the computer system.

In the preferred embodiment the present invention provides a method and apparatus for creating a target executable program from the source code of a target computer program for execution on a target processor. The target processor used by the method and apparatus has a first set of registers and a second set of registers. Generally, the target processor is capable of executing a first set of instructions which only address the first set of registers. The method and apparatus provides a second set of instructions for the target processor which includes a subset of frequently executed instructions within the first set of instructions. This second set of instructions is novel because the instructions are able to address both the first set of registers and the second set of registers. A compiler is provided and used for compiling the source code into a number of target executable instructions and for allocating the registers on the target processor. The registers within the second set of registers are only allocated to those target executable instructions in the second set of instructions. According to principles of the present invention, the more frequently executed instructions are able to address a register in the second set of registers located on the target processor In one embodiment, the invention provides a method and apparatus for providing the previously mentioned second set of instructions. Initially, the method and apparatus executes instructions in at least one test computer program on the target processor in order to determine average opcode execution frequencies. The present embodiment records execution frequencies for each instruction. Next, an execution frequency threshold is determined based upon the execution frequencies recorded. This execution frequency threshold is used in the compiler to segregate a second set of instructions from the first set of instructions during the course of processing a set of target program source code. The present embodiment compares the execution frequencies of each instruction with the execution frequency threshold. Those instructions in the first set of instructions with an execution frequency equal to or exceeding the execution frequency threshold are grouped into a subset of frequently executed instructions and defined as a second set of instructions. This subset of frequently executed instructions are capable of addressing registers in the second set of registers. In one embodiment, the prevent invention uses one or more unused bits in the first set of instructions to distinguish instructions in the first set of instructions from instructions in the second set of instructions.

In yet another embodiment, the invention provides a method and apparatus for compiling the source code of a target computer program into a target executable program which optimizes the use of registers on the target processor described above. In one embodiment, the target executable program is generated by a compiler. Initially, the compiler generates a plurality of intermediate instructions from the source code of the target computer program. The compiler assigns at least one virtual register to at least one intermediate instruction within the plurality of intermediate instructions. Typically, the virtual register assigned by the compiler may be shared by a number of separate intermediate instructions. The compiler marks each virtual register as poisoned if the virtual register is assigned to at least one intermediate instruction which represents an instruction in the first set of instructions. Next, the compiler allocates physical registers to each instruction. If a virtual register is marked as poisoned, the compiler allocates a register in the first set of registers to the instruction. However, if a virtual register is not marked as poisoned, the compiler allocates a register in the second set of registers to the instruction.

DESCRIPTION OF THE DRAWINGS

The objects, features and advantages of the system of the present invention will be apparent from the following description in which.

NOTATIONS AND NOMENCLATURE

Figure 1:
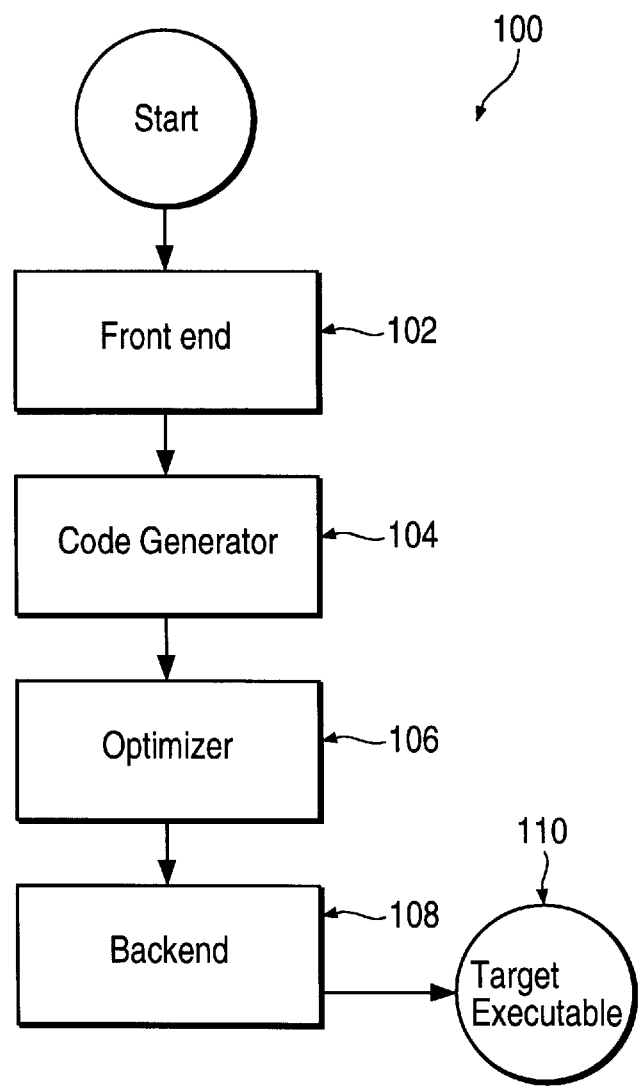
FIG. 1 illustrates a conventional optimizing compiler used for a multiple issue processor
Figure 2A:
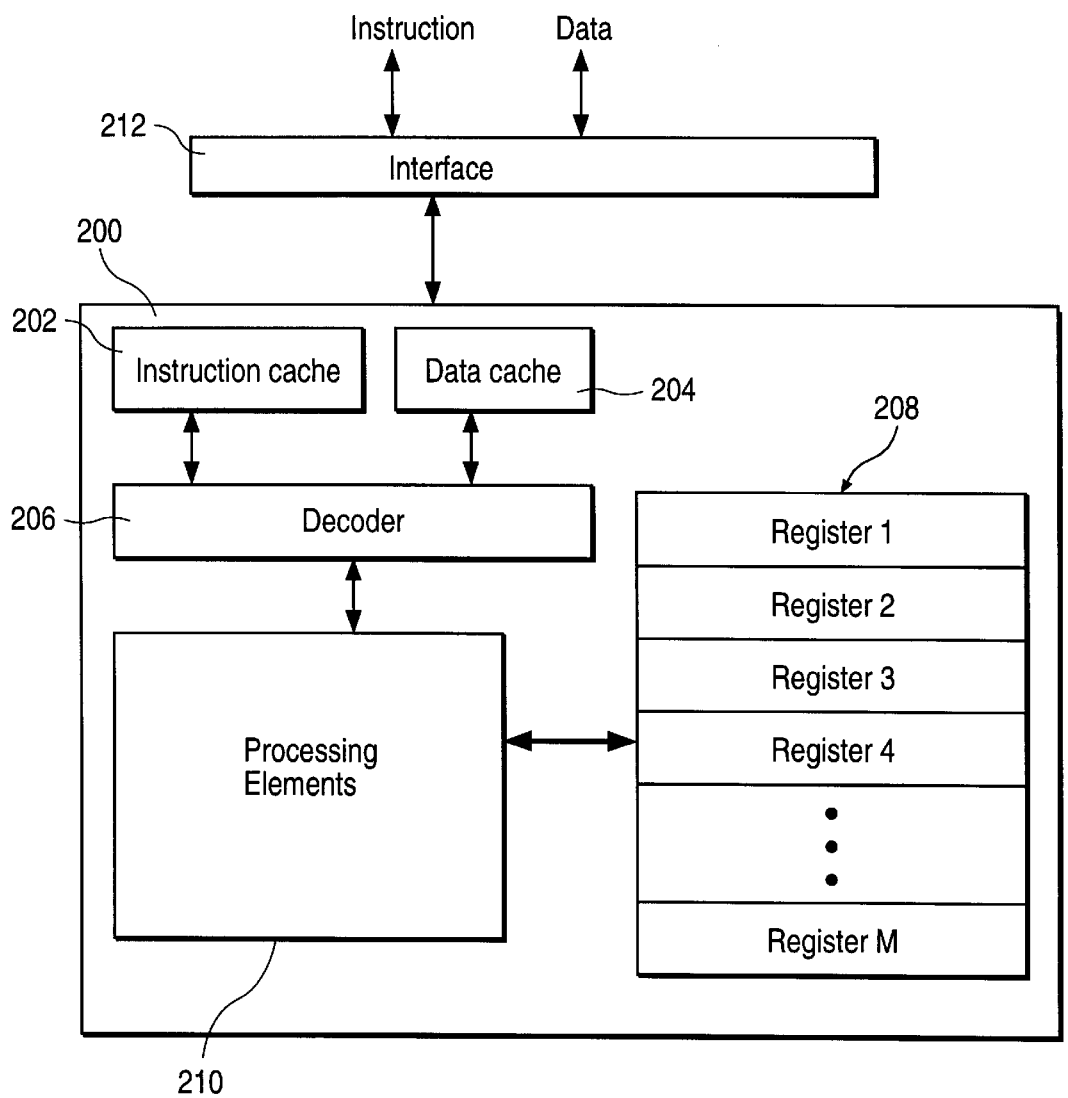
FIG. 2A illustrates an existing multiple issue processor capable of executing multiple instructions each clock cycle.
Figure 2B:
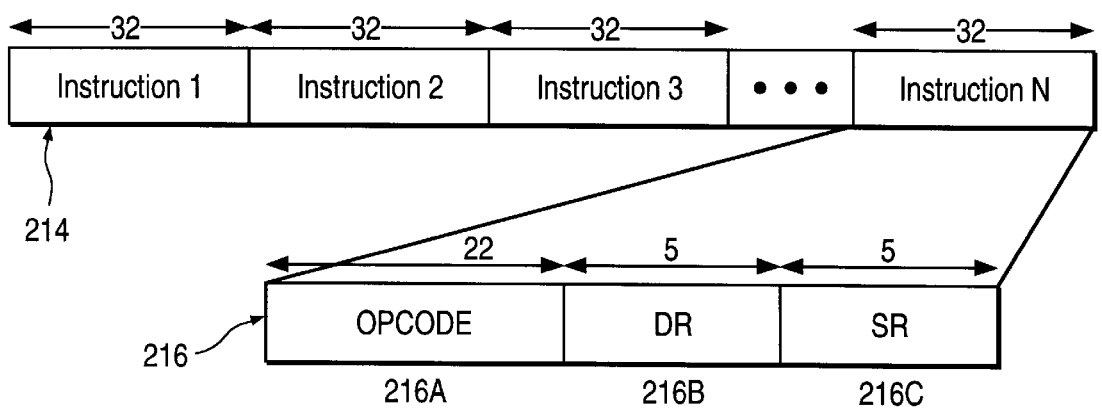
FIG. 2B illustrates a typical group of N instructions generated by a compiler for execution on multiple issue processor.

The detailed descriptions which follow are presented largely in terms of procedures and symbolic representations of operations on data bits within a computer memory. These procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods are disclosed for creating a target executable program from the source code of a target computer program for execution on a target processor. The target processor provided by the method and apparatus has a first set of registers and a second set of registers. In its various embodiments the present invention can be applied to all areas of computer design where a processor executes instructions which address additional registers. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily. Similarly, in the preferred embodiment, use is made of SPARC uni-processor and SPARC multi-processor computer systems as well as the Solaris operating system, all of which are made and sold by Sun Microsystems, Inc. However the present invention may be practiced on other computer hardware systems and using other compatible operating systems.

Overview of One Embodiment

Many advanced processor designs require a set of extended registers to execute computer programs efficiently. On a processor having only a first or regular register set, typically 32 registers, computer programs do not execute efficiently because the demand for registers exceeds the supply of registers. This deficiency in registers is known as registers pressure. A second or extended register set, typically containing 32 registers, is provided to reduce the register pressure. The present embodiment provides a novel method and apparatus for instructions to address the second set of registers without having to increase the bit length of the instructions. In particular, the present invention is especially useful on computer systems utilizing processors capable of issuing multiple instructions each clock cycle. However, those skilled in the art will understand that the present invention is also useful on any processor where the availability of additional high speed registers is desirable.

In its various embodiments, the present invention provides a method and apparatus for creating a target executable program from the source code of a target computer program for execution on a target processor. The target processor provided by the method and apparatus has a first set of registers and a second set of registers. Generally, the target processor is capable of executing a first set of instructions which only address the first set of registers. The method and apparatus provides a second set of instruction for the target processor which include a subset of frequently executed instructions within the first set of instructions. These second set of instructions are novel because they able to address both the first set of registers and the second set of registers. A compiler is provided and used for compiling the source code into a number of target executable instructions and allocating the registers on the target processor. The registers within the second set of registers are only allocated to those target executable instructions in the second set of instructions. According to principles of the present invention, the more frequently executed instructions are able to address a register in the second set of registers located on the target processor.

In one embodiment, the invention provides a method and apparatus for providing the previously mentioned second set of instructions. Initially, the method and apparatus executes instructions in at least one computer program on the target processor. The present embodiment records execution frequencies for each instruction in the first set of instructions. Next, an execution frequency threshold is determined based upon the execution frequencies recorded. The present embodiment compares the execution frequencies of each instruction with the execution frequency threshold. Those instructions in the first set of instructions with an execution frequency equal to or exceeding the execution frequency threshold are grouped into a subset set of frequently executed instructions and defined as a second set of instructions. This subset of frequently executed instructions are capable of addressing registers in the second set of registers. In one embodiment, the prevent invention uses one or more unused bits in the first set of instructions to distinguish instructions in the first set of instructions from instructions in the second set of instructions.

In yet another embodiment, the invention provides a method and apparatus for compiling the source code of a target computer program into a target executable program which optimizes the use of registers on the target processor described above. In one embodiment, the target executable program is generated by a compiler. Initially, the compiler generates a plurality of intermediate instructions from the source code of the target computer program. The compiler assigns at least one virtual registers to at least one intermediate instruction within the plurality of intermediate instructions. Typically, the virtual register assigned by the compiler may be shared by a number of separate intermediate instructions. The compiler marks each virtual register as poisoned if the virtual register is assigned to at least one intermediate instruction which represents an instruction in the first set of instructions. Next, the compiler allocates physical registers to each virtual register assigned in the assigning step. If a virtual register is marked as poisoned, the compiler allocates a register in the first set of registers to the virtual register. However, if a virtual register is not marked as poisoned, the compiler allocates a register in the second set of registers to the virtual register.

Operating Environment

Figure 3:
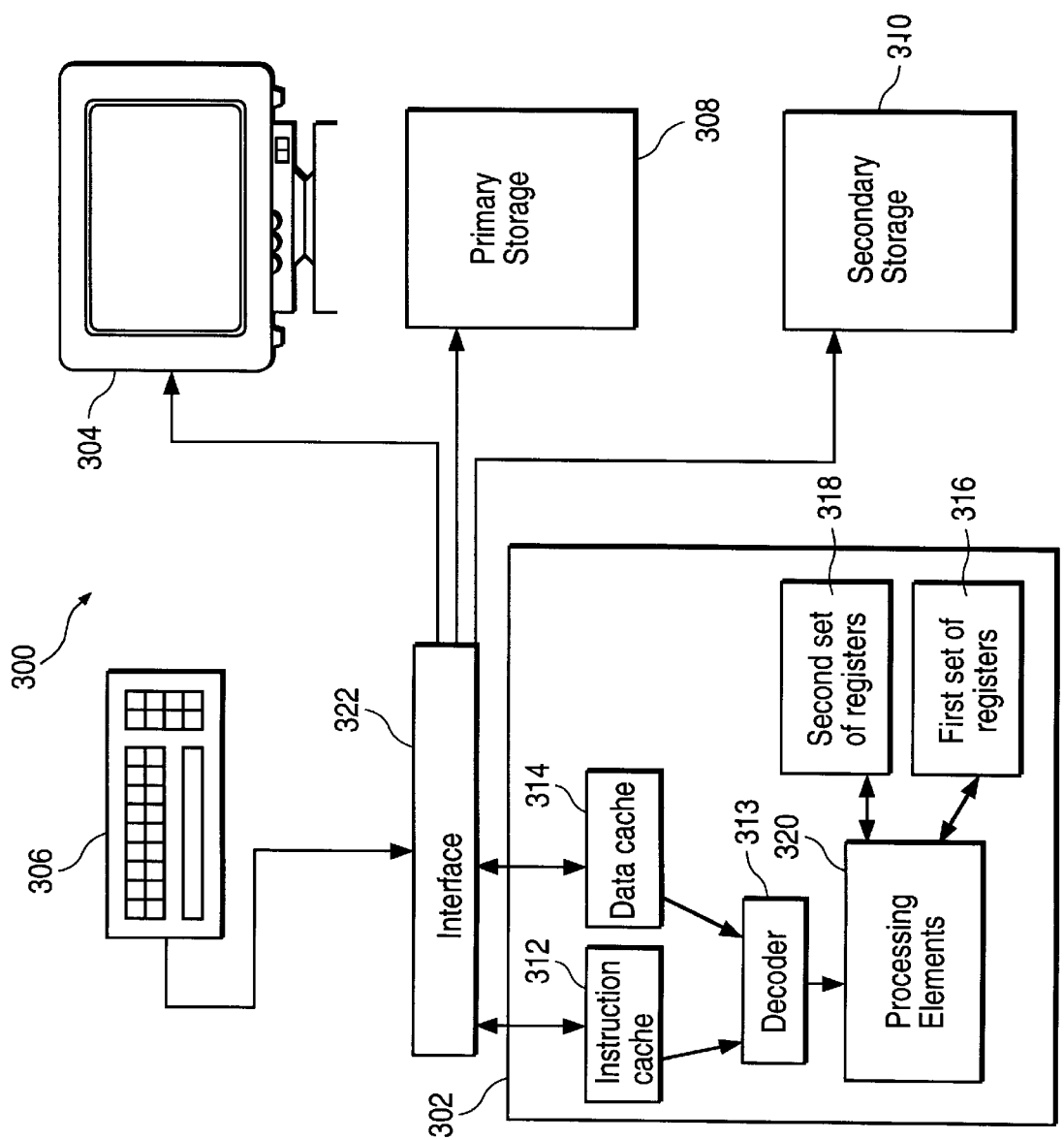
FIG. 3 is a block diagram of a computer system which illustrates one environment for practicing various embodiments of the present invention.

FIG. 3 is a block diagram of a computer system 300 which illustrates one environment for practicing the present invention. Typically, a computer system 300 includes a processor 302, a display device 304, an input device 306 such as a keyboard, a primary storage device 308 and a secondary storage device 310. Display device 304 can display a graphical user interface (GUI) for facilitating the display of graphics and text for the user using the system 300. Display devices 304 include, for example, printers and computer display screens such as cathode ray tubes (CRT's), light-emitting diode (LED) displays, and liquid crystal displays (LCD's). Input devices 306 can include, without limitation, electronic keyboards and pointing devices such as electronic mice, trackballs, lightpens, thumbwheels, digitizing tablets, and touch sensitive pads.

Processor 302 is capable of executing multiple instructions each clock cycle and contains functional units which include, but are not limited to, an instruction cache 312, a data cache 314, a decoder 316 coupled to instruction cache 312 and data cache 314, a first set of registers 316 and a second set of registers 318. The processor 302 can be, but is not limited to, Sun's UltraSPARC™, IBM's PowerPC™ series, MIPS' R1000™ and Intel's Pentium-Pro™. (These processor names are the trademarks respectively of Sun Microsystems, Inc., International Business Machines (IBM) Corp., MIPS Technologies, Inc. and Intel Inc.)

Instruction cache 312 is coupled to receive data from primary storage 308 or secondary storage 310 through an interface 322, such as an input/output subsystem. Instruction cache 312 stores instructions processor 302 executes most frequently. Decoder 313 compares the opcode of each instruction with various bit patterns in a look up table (LUT) (not shown). The LUT includes a list of all the bit patterns stored in the opcode portion of each valid instruction and the microinstructions or control signals necessary to cause processing elements 320 to perform the function associated with a specific instruction. A match between the opcode and a bit pattern in the LUT indicates that a valid instruction has been provided. Decoder 313 then interprets the opcode portion of each instruction and provides signals or microinstructions to processing elements 320 which causes them to execute specific functions. Processing elements 320 include arithmetic/logic units, floating point units, graphic units and any other functional units which process data.

In addition, decoder 313 interprets the address portion of each instruction and generates the address of the data being referenced. The address may refer to data located in first set of registers 316 or second set of registers 318. Data cache 314 stores data or addresses of data most often used by processing elements 320 for increasing the access times of data required by instructions. For more information on decoders see *Digital Systems and Hardware/Firmware Algorithms,* Milos D. Ercegovac and Tomas Lang, Wiley & Sons 1985, pg. 630–661 hereinafter referred to as *Digital Systems and Hardware/Firmware Algorithms.*

Executing these computer instructions enables processing elements 320 to retrieve data or write data to the primary storage 308, display information on one or more computer display devices 304, receive command signals from one or more input devices 306, or transfer data to secondary storage 310 or even other computer system which collectively form a computer network (not shown). Those skilled in the art understand that primary storage 308 and secondary storage 310 can include any type of computer storage including, without limitation, randomly accessible memory (RAM), read-only-memory (ROM), application specific integrated circuits (ASIC) and storage devices which include magnetic and optical storage media such as CD-ROM.

Modifying An Instruction Set to Address a First and Second Set of Registers

One embodiment of the present invention discloses a method and apparatus for modifying an instruction set to address a first and second set of registers. The first or regular set of registers can be addressed by the unmodified instruction set. However, the second or extended set of registers can only be addressed by an instruction set modified according to principles of the present invention.

In one embodiment, an existing instruction is modified to address a second set of registers located on a processor. In this embodiment, the present invention can be used to modify instruction sets which utilize registers while executing instructions. In the past, many processors had instruction sets which were only able to address the 32 registers. Using various embodiments of the invention, the instruction sets for these processors can be modified to address 32 more registers located in a second set of registers. Moreover, these novel modifications enable an instruction set to address more registers without increasing the bit length of an instruction.

Figure 4:
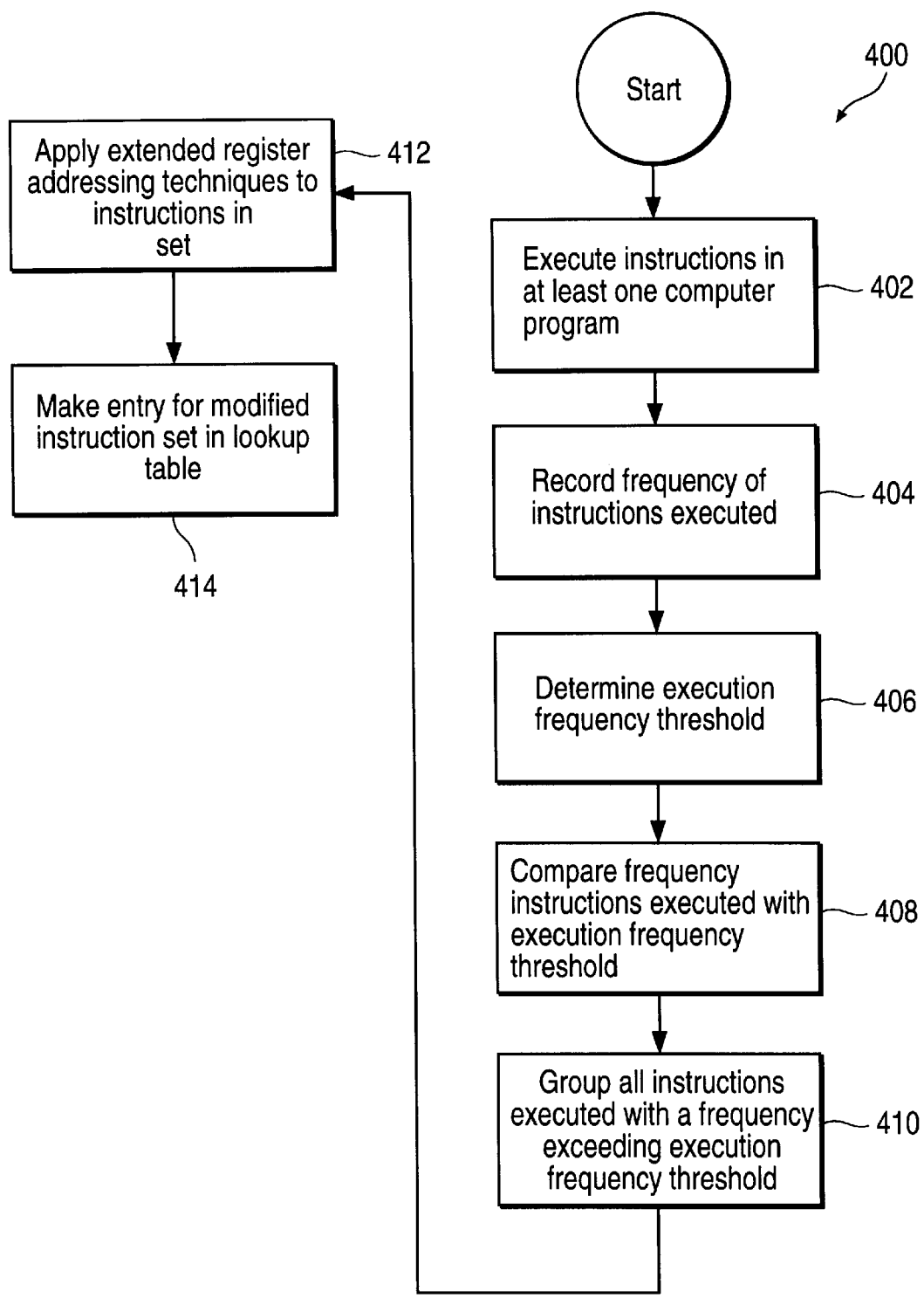
FIG. 4 is a flow diagram containing an overview of the steps used by one embodiment of the present invention to modify an instruction set for a target processor.

FIG. 4 is a flow diagram illustrating an overview of the steps used by one embodiment of the invention to modify an instruction set for a target processor. Initially, a benchmark or application containing at least one computer program is executed (step 402). During this time, the present embodiment records the frequency which each instruction is executed in these programs (step 404). Next, at step 406 the present embodiment determines an execution frequency threshold. In one embodiment, a threshold is selected which maximizes the number of extended instructions created using the present invention. At step 408, the present embodiment compares the execution frequency of each instruction with the execution frequency threshold. A subset of instructions are grouped together whose frequency exceeds the execution frequency threshold (step 410). At step 412, using various embodiments of the invention described in detail below, this subset of frequently executed instructions is used to generate a second set of instructions which can address the second set of registers. At step 414, the present embodiment modifies a look up table (LUT) which contains a list of all valid executable instructions on the processor. This LUT is used by a decoder on the target processor to recognize any new or modified instructions provided in a target executable program. The information contained in the LUT is also used by a compiler, described in detail below, to generate an executable module.

In one embodiment, an instruction set is modified using one or more unused bits in an instruction in the original instruction set. Typically, each instruction has an operation code (opcode) portion and an operand or register addressing portion. One novel aspect of the invention, uses unused bits in the instruction set to extend the register addressing portion of an instruction. This enables the modified instruction set to address the second set of registers. The Applicant contemplates that there are many techniques, in addition to the exemplary embodiments described in detail below, where the unused bits in an instruction set can be used to modify an instruction set.

Figure 5:
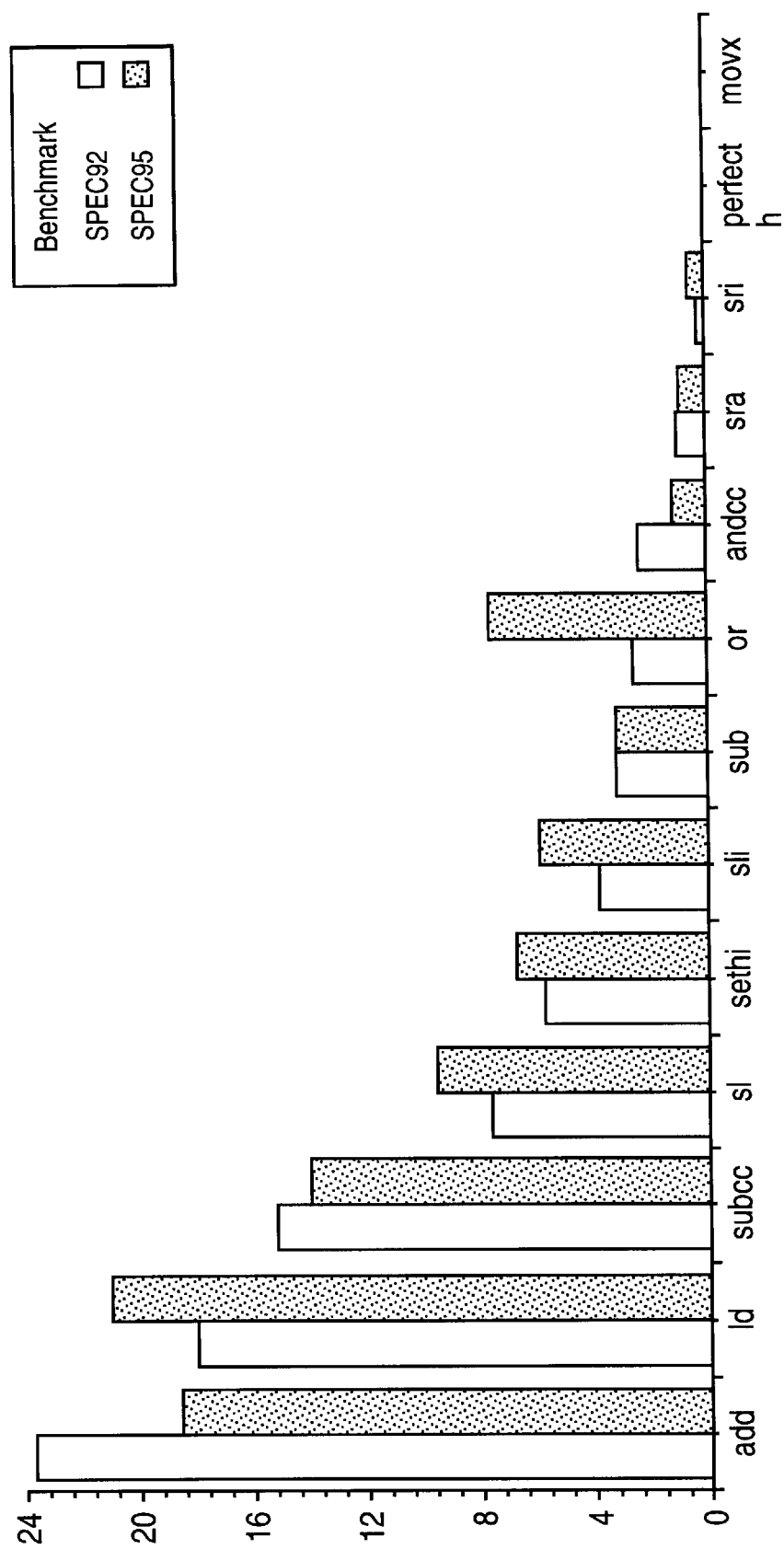
FIG. 5 is an exemplary histogram showing which instructions in the SPARC architecture instruction set are executed most often while running the SPECint92 and SPECint95 benchmarks.

In a first embodiment, a new instruction is created using the unused bits in an instruction to extend the register addressing portion of an instruction. FIG. 5 is a flow diagram of the creation of a new instruction using a first embodiment of the present invention. Initially, an unused operation code (opcode) is located by searching through the existing set of opcodes within the existing instruction set (step 502). An unused opcode is a bit pattern which has not been used in the opcode portion of any existing instruction in the instruction set. At step 504, a new instruction is defined having the previously unused opcode value stored in the opcode portion of the new instruction. At step 506, one or more unused bits in the new instruction are used to extend at least one of the register addressing portions of the instruction. In one embodiment, the unused bits are used to extend the high order bits of the register addressing portion of an instruction. During execution the modified instruction can address either a register in the first set of registers or the second set of registers. To address the second set or registers on a processor, the register address portion of the instruction contains a '1' value in the high order bit. Conversely, to address the first set of registers on a processor, the register address portion of the instruction contains a '0' value in the high order bit.

Figure 6:
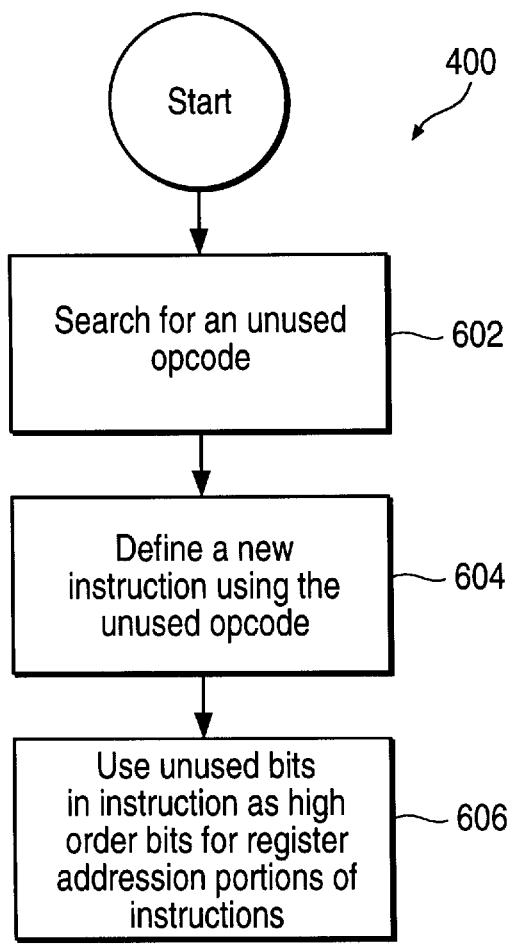
FIG. 6 is a flow diagram of the creation of a new instruction using a first embodiment of the present invention.

FIG. 6A shows the format of an extended register instruction utilizing the first embodiment of the present invention. Assume a processor is capable of executing a 32 bit instruction word and has a first set of 32 registers and a second set of 32 registers. Further assume that an unused opcode is found where the instruction format is similar to the instruction format illustrated in FIG. 6A. In this case, the instruction set has 20 bits allocated to an opcode portion, 5 bits are allocated to the source register address (SR) portion and 5 bits allocated to the destination register address (DR) portion. The two unused bits, DX and SX, are reserved for extending the register addressing of the DR and SR portions respectively. Generally, the DX and SX bits may be located anywhere within the instruction. In an exemplary embodiment, the DX bit is used to store the high order bit of the destination register address and the SX bit is used to store the high order bit of the source register address. For example, extended register address 62 (binary '111110') would be stored in the "source" register of an instruction by placing bits '11110' in the SR portion and '1' in the SX portion. Similarly, extended register address 61 (binary '111101') would be allocated to the "destination" register of the instruction by placing '11101' in the DR portion of the instruction and '1' in the DX portion of the instruction. Upon execution of this instruction, the processor would append the SX portion to the high order bits of the SR portion to determine the source register address. Similarly, the processor would append the DX portion to the high order bits of the DR portion of the instruction to determine the destination register address.

In a second embodiment, an instruction is created which utilizes an unused bit to address either a high order set of registers or a low order set of registers on the processor. Initially, an unused bit is located within an instruction in the subset of frequently executed instructions previously selected. The unused bit is defined as a HIGH bit. A first value stored in the HIGH bit indicates that the register address within an instruction refers to a register in the high order or first set of registers on the processor. Similarly, a second value stored in the HIGH bit indicates that the register address within an instruction refers to a register in the low order or second set of registers on the processor.

FIG. 6B shows the format of an extended register instruction utilizing the second embodiment of the present invention. Assume a processor is capable of executing a 32 bit instruction word and has a first and second set of registers with a total of 64 registers. Further assume that an unused opcode is found where the instruction format is to the instruction format illustrated in FIG. 6B. In this case, the instruction set has twenty-one bits allocated to an opcode portion, five bits are allocated to the source register address (SR) portion and five bits allocated to the destination register address (DR) portion. The unused bit, the HIGH bit, in FIG. 6B is the located between the opcode portion and the DR portion of the instruction but generally could be located anywhere within the instruction. In this second embodiment, the present invention would address source register 62 (binary '111110') by placing '11110' in SR register address portion and address destination register 61 (binary '111101') by placing '11101' in DR portion of the instruction. The HIGH bit would be set to '1' to indicate that the register addressing portions of the instructions should only access the high order or second set of registers on the processor. Setting the HIGH bit to '1' implies that the SR register contains register address 62 (binary '111110') and not 31(binary '11110'). Similarly, it also implies that the DR register contains register address 61 (binary '111101') and not register address 29 (binary '11101').

Those skilled in the art understand that the teachings of the present invention could be used to design instructions in ways not specifically disclosed herein. The Applicant contemplates that the exact usage of the unused bits in an instruction may vary depending on the exact format of a given instruction. Furthermore, any exemplary techniques of creating an extended register instruction have been provided to illustrate various implementations of the present invention. These techniques should not be construed to limit the scope of the invention.

Figure 7A:
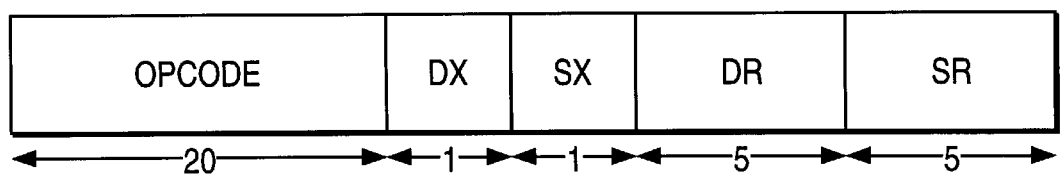
FIG. 7A is the format of an extended register instruction utilizing a first embodiment of the present invention.
Figure 7B:
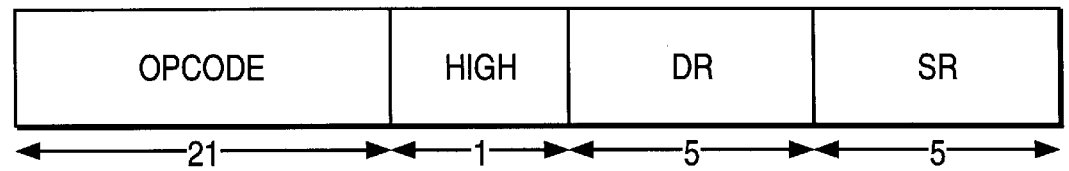
FIG. 7B is the format of an extended register instruction utilizing a second embodiment of the present invention.

In operation, one embodiment could be used to modify the instruction set used by the SPARC architecture processors. FIG. 7 illustrates an exemplary histogram showing which instructions in the SPARC architecture instruction set are executed most often while running the SPECint 92and SPECint95 benchmarks. These benchmarks provide a representative cross section of integer intensive programs a user might typically execute. They are best suited to optimize the use of registers when performing integer intensive applications executed on a SPARC based processor. Those skilled in the art understand that a different set of benchmarks or applications may be selected to optimize the register allocation on different processor platforms or for executing applications which are not primarily integer intensive. Next, a execution frequency threshold is determined. The histogram in FIG. 7 shows which instructions in the SPARC instruction set exceeded the execution frequency threshold. Using various embodiments of the present invention described above, SPARC instructions able to address a second set of registers include: add, ld, subcc, st, sethi, sll, sub, or, andcc, sra, srl, prefetch, and movx in descending order of frequency. These instructions are grouped together and given the ability to access 32 additional registers located in second set of registers on a SPARC processor.

Compiling Source Code Which Optimizes use of First and Second Set of Registers

A second embodiment of the present invention discloses a method and apparatus for generating a target executable program which optimizes the registers on a target processor. The target processor has a first set of instructions capable of addressing only the registers in a first set of registers. A second set of instructions are capable of addressing registers in either the first set of registers or a second set of registers. The present invention ensures that the frequently executed instructions are allocated registers from the second set of registers. Furthermore, the present invention is designed to prevent a register from the second set of registers from being allocated to a frequently executed instruction in the first set of instructions if the same register must be shared with a less frequently executed instruction in the second set of instructions. This prevents data from being stored in a register in the second set of registers which an instruction in the first set of instructions needs but can not access.

Figure 8:
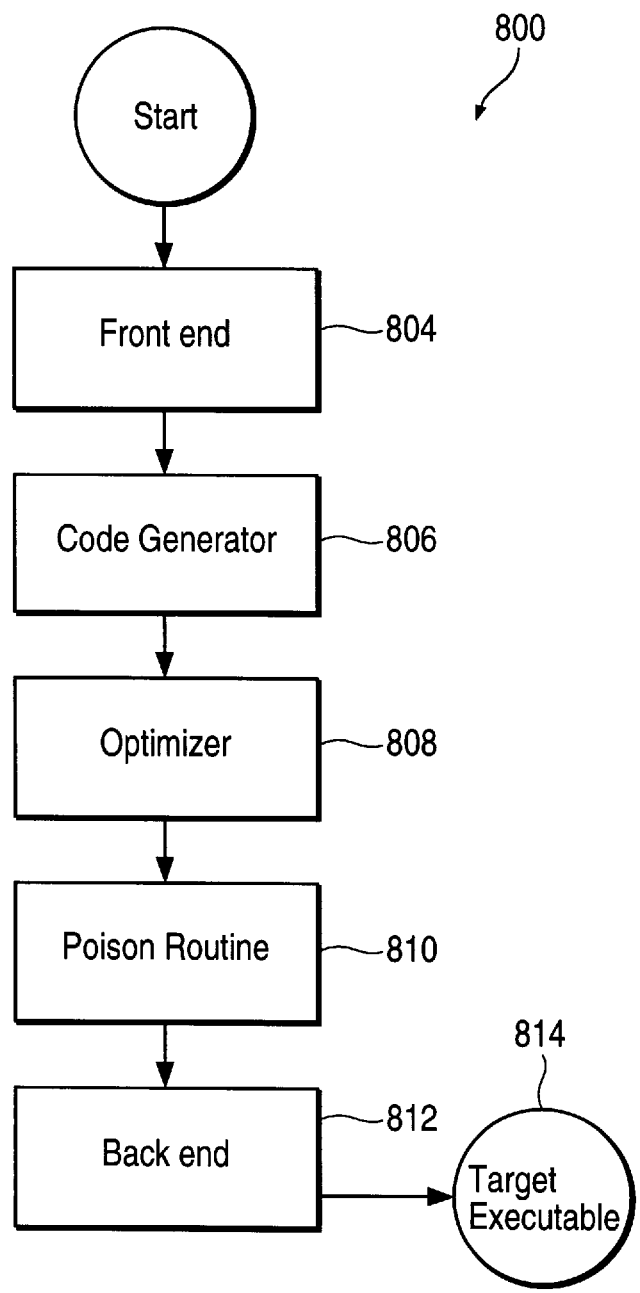
FIG. 8 is a flow diagram for a compiler utilizing one embodiment of the present invention to generate a target executable program from the source code of computer program.

FIG. 8 is a flow diagram for a compiler 800 utilizing one embodiment of the present invention to generate a target executable program from the source code of computer program. Accordingly, the compiler 800, includes a front end portion 804, a code generator 806, an optimizer 808, a poison routine 810 and a back end portion 812. Those skilled in the art should understand that the present invention may also apply to any compiler, other than the compiler illustrated in FIG. 8, where an executable program is generated for execution on a processor.

Initially, the front end 804 of compiler 800 receives a computer program written in source code and performs various preprocessing operations on the code. At step 806, a code generator takes the source code and generates a set of intermediate instructions which are semantically equivalent to the source code. These instructions are typically described in a machine independent intermediary code format. At step 806, the code generator associates one or more virtual registers to each intermediate instruction. The allocation of virtual registers is well known in the art of register allocation within a compiler. Typically, the total number of virtual registers allocated by the code generator corresponds to the overall demand for high-speed registers. At step 808, the intermediate code generated by the code generator is provided to the code optimizer. The code optimizer attempts to improve the intermediate code so that faster-running executable code will result. Some code optimizers 808 are trivial and others do a variety of computations in an attempt to produce the most efficient executable program possible. These various computations include such code transformations as common sub-expression elimination, dead-code elimination, renaming of temporary variables and interchange of two independent adjacent statements as well as register allocation. Those skilled in the art will recognized that a code optimizer is an optional component of compiler 800 and is included in the present case for completeness. Furthermore, one skilled in the art will recognized that the present invention has equal application in compilers which do not utilize optimizers.

At step 810, a poisoning routine indicates if a virtual register is "poisoned". The poisoning process is an important step in generating an executable program which utilizes the first and second set of registers in an optimal manner. Poisoning step 810 utilizes the lookup table (LUT) generated in the previously discussed embodiment of the present invention. Essentially, the LUT contains a list of all valid executable instructions on the processor. This LUT typically contains a first set of instructions and a second set of instructions. The first set of instructions execute less frequently than the second set of instructions and typically can not address the second set of registers. A virtual register is marked as poisoned if the virtual register is assigned to at least one intermediate instruction which represents an instruction in the first set of instructions. The virtual register is poisoned because the register was assigned to an instruction which is not capable of addressing registers in both the first and second register sets. In contrast, a virtual register is not marked as poisoned if it is only assigned to an instruction in the second set of instructions found in the LUT. The instruction in the second set of instructions can address a register in either the first or the second set of registers.

Figure 9:
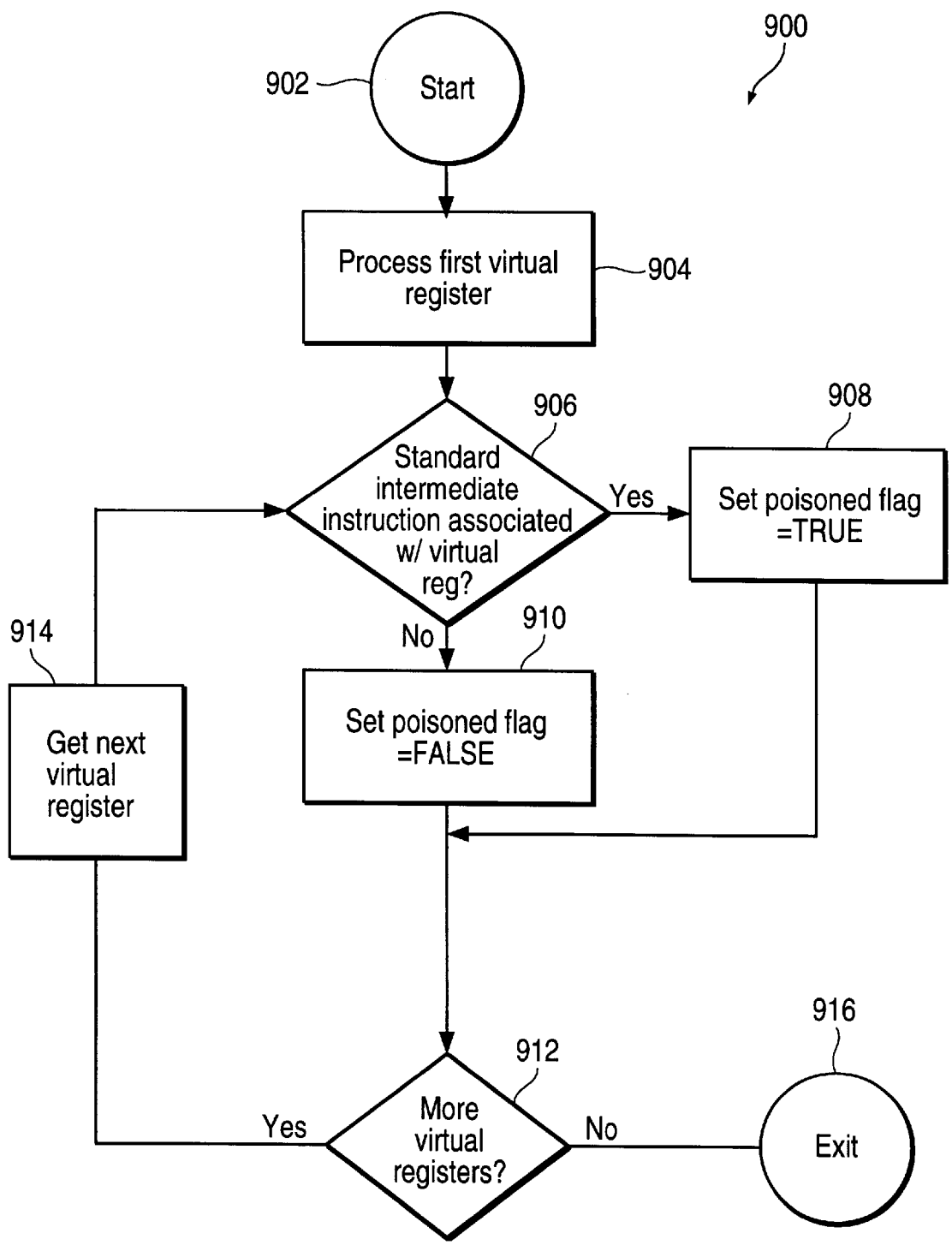
FIG. 9 is a flow diagram further illustrating the steps used by one embodiment of the present invention to mark a virtual register as poisoned.

FIG. 9 is a flow diagram further illustrating the steps used by one embodiment of the invention to mark a virtual register as poisoned. At step 902, the method receives a list of the virtual registers which includes a list of the intermediate instructions assigned to each virtual register. Typically, the list of intermediate instructions have already been optimized by a code optimizer within the compiler. At step 904, the method begins the poisoning process with the first virtual register in the list of virtual registers. The virtual register may be associated with one or more intermediate instructions. At step 906, the method determines if an instruction from the first set of instructions has been associated with the virtual register. In one embodiment, the method compares the opcode of the instruction with bit patterns in the LUT. The LUT indicates whether the instruction is in the first or the second set of instructions. If at least one instruction from the first set of instructions is associated with the virtual register then the virtual register being processed is marked as poisoned (step 908). However, if only instructions from the second set of instructions are associated with the virtual register then the virtual register is marked as not being poisoned (step 910). At step 912, the method determines if additional virtual registers were allocated by the code generator portion of the compiler. If no more virtual registers were allocated then the poisoning method ends at step 916. Conversely, if additional virtual registers were allocated then the next virtual register is retrieved at step 914 and processed in a similar fashion starting at step 906. This process is repeated for all virtual registers until all virtual registers allocated by the compiler have been processed and marked accordingly.

Referring back to FIG. 8, at step 812 the backend portion of the compiler determines which instructions to generate and how to allocate physical registers on the processor to the virtual registers assigned to the intermediate instructions. Initially, the backend receives an intermediate instruction and determines if the intermediate instruction should be substituted with an instruction in the first set of instructions or the second set of instructions. If the intermediate instruction is associated with a poisoned virtual register then the backend will substitute an instruction from the first set of instructions listed in the LUT and allocate one or more registers from the first set of registers. However, if the intermediate instruction is not associated with a poisoned register then the back end will substitute an instruction from the second set of instructions listed in the LUT and allocate one or more registers from the second set of registers. The poison indicator is a novel way to ensure that the backend does not allocate a register from the second set of registers on the processor to an instruction in the first set of instructions. Eventually, at step 814 the backend generates an executable suitable for execution on a target processor.

There are several advantages the invention provides which were unavailable in the past. First, the invention facilitates the use of additional registers on a processor without extending the width of the instruction word. In its various embodiments, the invention utilizes unused bits in the instruction word to address additional registers available on the processor. As a result, older computer hardware and software will remain fully compatible with newer hardware and software utilizing the invention.

Second, the invention does not require additional memory and disk space to store instructions generated with the invention. In the past, additional registers on a processor could only be addressed by increasing the instruction word width. Consequently, the wider instruction words required twice or three times the original memory and disk space as the original instruction words. In contrast, the invention does not require additional disk or memory storage to execute efficiently. Instead, the invention uses one or more of the unused bits in a given instruction to address the additional registers. Thus executables generated using the present invention do not require more disk or memory storage because they are the same size as executables generated without the present invention.

Third, the invention can be utilized in a computer system at a minimal cost. Manufactures of computer systems with a processor using the invention do not have to modify various bus widths within the system because the instruction bit width is not increased. This eliminates engineering costs to redesign the hardware and tooling costs associated with manufacturing new computer hardware equipment. Essentially, the invention enables an instruction in an instruction set to address an additional set of registers without having to redesign various components of the computer system.

It will be appreciated by those skilled in the art that various modifications and alterations may be made in the preferred embodiments of the invention disclosed herein without departing from the scope of this invention. Accordingly, the scope of the invention is not to be limited to the particular invention embodiments discussed above, but should be defined only by the claims set forth below and equivalents thereof.

What is claimed is:

1. A computer implemented method for creating a target executable program from the source code of a target computer program for execution on a target processor, said method comprising the steps of:

provideing a target processor having a first set of registers and a second set of registers;

providing a first set of instructions for said target processor, wherein said first set of instructions are only able to address said first set of registers;

providing a second set of instructions for said target processor, wherein said second set of instructions comprises a subset of frequently executed instructions within said first set of instructions wherein said second set of instructions are able to address said first set of registers and said second set of registers; and compiling said source code into a plurality of target executable instructions wherein the registers within said second set of registers are only allocated to those target executable instructions in said second set of instructions, whereby frequently executed instructions are able to address a register in said second set of registers located on said target processor.

2. The method of claim 1 wherein said step of providing said second set of instructions further comprises the steps of:

executing instructions in at least one computer program on said target processor;

recording an execution frequency for each instruction in said first set of instructions;

determining an execution frequency threshold based upon said execution frequencies recorded in said recording step; and grouping instructions from said first set of instructions with an execution frequency equal to or exceeding said execution frequency threshold into a subset set of frequently executed instructions, said subset of frequently executed instructions capable of addressing registers in said second set of registers.

3. The method of claim 2 wherein said step of grouping further comprises the step of using one or more unused bits in the first set of instructions to distinguish instructions in said first set of instructions from instructions in said subset of instructions.

4. The method of claim 1 wherein said step of compiling further comprises the steps of:

generating a plurality of intermediate instructions from said source code of said target computer program;

assigning at least one virtual register to at least one intermediate instruction within said plurality of intermediate instructions, wherein a virtual register may be shared by a plurality of intermediate instructions;

marking a virtual register as poisoned if said virtual register is assigned to at least one intermediate instruction which represents an instruction in said first set of instructions;

allocating physical registers to each instruction assigned in said assigning step by performing the following steps:

if a virtual register is marked as poisoned then allocating a register in said first set of registers to said instruction; and if a virtual register is not marked as poisoned then allocating a register in said second set of register to said instruction.

5. A method of modifying an instruction set of a target processor, said method comprising the steps of:

providing a target processor having a first set of registers and a second set of registers;

providing a first set of instructions for said target processor, wherein said first set of instructions are only able to address said first set of registers;

executing instructions in at least one computer program on said target processor;

recording an execution frequency for each instruction in said first set of instructions executed in said step of executing;

determining an execution frequency threshold based upon said execution frequencies recorded in said recording step; and grouping instructions from said first set of instructions with an execution frequency equal to or exceeding said execution frequency threshold into said subset set of frequently executed instructions, said subset of frequently executed instructions capable of addressing registers in said second set of registers, whereby frequently executed instructions are able to address a register in said second set of registers located on said target processor.

6. The method of claim 5 wherein said at least one computer program in said executing step SPECint92.

7. The method of claim 5 wherein said at least one computer program in said executing step SPECint95.

8. The method of claim 5 wherein said execution frequency threshold in said determining step is selected in a manner which maximizes the number of instructions capable of addressing said additional set of registers.

9. A method of compiling the source code of a target computer program into a target executable program which optimizes the use of registers on a target processor, said method further comprising the steps of:

providing a target processor having a first set of registers and a second set of registers;

providing a first set of instructions for said target processor, wherein said first set of instructions are only able to address said first set of registers;

providing a second set of instructions for said target processor, wherein said second set of instructions comprises a subset of frequently executed instructions within said first set of instructions wherein said second set of instructions are able to address said first set of registers and said second set of registers;

generating a plurality of intermediate instructions from said source code of said target computer program;

assigning at least one virtual registers to at least one intermediate instruction within said plurality of intermediate instructions, wherein a virtual register may be shared by a plurality of intermediate instructions;

marking a virtual register as poisoned if said virtual register is assigned to at least one intermediate instruction which represents an instruction in said first set of instructions;

allocating physical registers to each instruction assigned in said assigning step by performing the following steps:

if a virtual register is marked as poisoned then allocating a register in said first set of registers to said instruction; and if a virtual register is not marked as poisoned then allocating a register in said second set of register to said instruction.

10. An apparatus for creating a target executable program from the source code of a target computer program for execution on a target processor comprising:

a first program mechanism which provides a target processor having a first set of registers and a second set of registers;

a second program mechanism which provides a first set of instructions for said target processor, wherein said first set of instructions are only able to address said first set of registers;

a third program mechanism which provides a second set of instructions for said target processor, wherein said second set of instructions comprises a subset of frequently executed instructions within said first set of instructions further wherein said second set of instructions are able to address said first set of registers and said second set of registers; and a fourth program mechanism which compiles said source code into a plurality of target executable instructions wherein the registers within said second set of registers are only allocated to those target executable instructions in said second set of instructions, whereby frequently executed instructions are able to address a register in said second set of registers located on said target processor.

11. The apparatus of claim 10 wherein said third program mechanism which provides said second set of instructions further comprises:

a first program mechanism which executes instructions in at least one computer program on said target processor;

a second program mechanism which records an execution frequency for each instruction in said first set of instructions;

a third program mechanism which determines an execution frequency threshold based upon said execution frequencies recorded in said recording step; and a fourth program mechanism which groups instructions from said first set of instructions with an execution frequency equal to or exceeding said execution frequency threshold into said subset set of frequently executed instructions, said subset of frequently executed instructions capable of addressing registers in said second set of registers.

12. The apparatus of claim 10 wherein said fourth program mechanism which compiles further comprises:

a first program mechanism which generates a plurality of intermediate instructions from said source code of said target computer program;

a second program mechanism which assigns at least one virtual register to at least one intermediate instruction within said plurality of intermediate instructions, wherein a virtual register may be shared by a plurality of intermediate instructions;

a third program mechanism which marks a virtual register as poisoned if said virtual register is assigned to at least one intermediate instruction which represents an instruction in said first set of instructions;

a fourth program mechanism which allocates a register in said first set of registers to an instruction if said instruction has a virtual register marked as poisoned; and a fifth program mechanism which allocates a register in said second set of registers to an instruction if said instruction uses a virtual register not marked as poisoned.

13. A computer program product comprising:

a computer usable medium having computer readable program code tangibly embedded in said computer program product, the program code configured to cause the computer to create a target executable program from the source code of a target computer program for execution on a target processor, said code comprising:

code that provides a target processor having a first set of registers and a second set of registers;

code that provides a first set of instructions for said target processor, wherein said first set of instructions are only able to address said first set of registers;

code that provides a second set of instructions for said target processor, wherein said second set of instructions comprises a subset of frequently executed instructions within said first set of instructions wherein said second set of instructions are able to address said first set of registers and said second set of registers; and code that compiles said source code into a plurality of target executable instructions wherein the registers within said second set of registers are only allocated to those target executable instructions in said second set of instructions, whereby frequently executed instructions are able to address a register in said second set of registers located on said target processor.

14. The computer program product of claim 13 wherein said code that provides said second set of instructions further comprises:

code that executes instructions in at least one computer program on said target processor;

code that records an execution frequency for each instruction in said first set of instructions;

code that determines an execution frequency threshold based upon said execution frequencies recorded in said recording step;

code that compares said execution frequencies for each instruction from said step of recording with said execution frequency threshold from said step of determining; and code that groups instructions from said first set of instructions with an execution frequency equal to or exceeding said execution frequency threshold into said subset set of frequently executed instructions, said subset of frequently executed instructions capable of addressing registers in said second set of registers.

15. The computer program product of claim 13 wherein said code that compiles further comprises:

code that generates a plurality of intermediate instructions from said source code of said target computer program;

code that assigns at least one virtual register to at least one intermediate instruction within said plurality of intermediate instructions, wherein a virtual register may be shared by a plurality of intermediate instructions;

code that marks a virtual register as poisoned if said virtual register is assigned to at least one intermediate instruction which represents an instruction in said first set of instructions;

code that allocates a register in said first set of registers to an instruction if said instruction uses a virtual register marked as poisoned; and code that allocates a register in said second set of registers to an instruction if said instruction uses a virtual register not marked as poisoned.

* * * * *